United States Patent
Monoi et al.

(10) Patent No.: US 6,326,443 B1
(45) Date of Patent: *Dec. 4, 2001

(54) PROCESS FOR PREPARING ETHYLENE POLYMER AND CATALYST USED THEREFOR

(75) Inventors: Takashi Monoi; Masakazu Yamamoto; Hidenobu Torigoe; Yoshimitsu Ishihara; Shintaro Inazawa, all of Oita (JP)

(73) Assignee: Showa Denko K.K., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,284

(22) PCT Filed: Apr. 11, 1997

(86) PCT No.: PCT/JP97/01273

§ 371 Date: Dec. 11, 1998

§ 102(e) Date: Dec. 11, 1998

(87) PCT Pub. No.: WO98/46653

PCT Pub. Date: Oct. 22, 1998

(51) Int. Cl.[7] .............................. C08F 4/22; C08F 110/02; C08F 4/58
(52) U.S. Cl. ........................... 526/129; 526/154; 526/352; 502/104; 502/150
(58) Field of Search .................................... 502/117, 152, 502/104, 150; 526/943, 352, 160, 127, 129, 169, 172, 154

(56) References Cited

U.S. PATENT DOCUMENTS

| | | | | |
|---|---|---|---|---|
| 4,212,765 | * | 7/1980 | Gutweiler | 252/430 |
| 5,034,364 | | 7/1991 | Kral et al. | 502/117 |
| 5,723,399 | * | 3/1998 | Takemoto et al. | 502/113 |
| 6,011,127 | * | 1/2000 | Monoi et al. | 526/127 |

FOREIGN PATENT DOCUMENTS

| | | |
|---|---|---|
| 54-120290 A | 9/1979 | (JP) . |
| 9-25313 A | 1/1997 | (JP) . |

* cited by examiner

Primary Examiner—David W. Wu
Assistant Examiner—R. Harlan
(74) Attorney, Agent, or Firm—Sughrue, Mion, Zinn, Macpeak & Seas, PLLC

(57) ABSTRACT

A polymerization catalyst which exhibits a high activity and a good hydrogen response and thus is suitable for the production of an ethylene polymer having a wide molecular weight range can be obtained by a method using a chromium compound, an organic aluminum compound and a carrier and comprising the following steps (a) to (d): (a) contacting a chromium compound with a carrier in the presence or absence of a solvent; (b) adding an organic aluminum compound to said contacted substances at a temperature of not higher than 60° C. in an amount such that the mixing ratio of said organic aluminum compound to said chromium compound falls within the range of from 0.5/1 to 100/1 as calculated in terms of the ratio of aluminum atom/chromium atom (Al/Cr molar ratio) and that the following relationship (1) is satisfied:

$$\log_{10} t \leq 0.33 \log_{10} C + 0.35 \quad (1)$$

wherein t represents the time (min) required until the organic aluminum compound is added to give an Al/Cr molar ratio of 10/1; and C represents the amount of the carrier used (Kg); (c) after the addition of the organic aluminum compound, stirring at a temperature of from 0° C. to 60° C. for 0.5 to 4 hours; and (d) removing the solvent used, unreacted matters and by-products at a temperature of not higher than 60° C. in such a manner that the following relationship (2) is satisfied:

$$\log_{10} T \leq 0.23 \log_{10} C + 1.10 \quad (2)$$

wherein T represents the time required until the removal is completed; and C represents the amount of the carrier used (Kg).

6 Claims, No Drawings

PROCESS FOR PREPARING ETHYLENE POLYMER AND CATALYST USED THEREFOR

TECHNICAL FIELD

The present invention relates to a polymerization catalyst and a process for the production of an ethylene polymer in the presence thereof. More particularly, the present invention relates to a novel polymerization catalyst having a high activity and a good hydrogen response, which comprises a chromium compound, an organic aluminum compound and a carrier and which is prepared by a specific method, and to a process for the production of an ethylene polymer having a wide molecular weight range at a remarkably enhanced productivity using the polymerization catalyst.

BACKGROUND OF THE INVENTION

In the production of an ethylene polymer in the presence of a catalyst containing a transition metal, the use of a catalyst obtained by supporting a chromium compound on a carrier makes it possible to produce an ethylene polymer having properties which cannot be attained by other catalysts such as Ziegler catalyst. Thus, such a catalyst is generally known as a representative ethylene polymerization catalyst comparable to Ziegler catalyst.

It is known that the use of a so-called Phillips catalyst comprising chromium trioxide supported on a solid inorganic oxide such as silica makes it possible to produce a blow-moldable ethylene polymer having an excellent moldability. However, the Phillips catalyst is disadvantageous in that it undergoes no effect of a molecular weight modifier such as hydrogen as generally used for Ziegler catalyst and thus exhibits a poor hydrogen response. Thus, ethylene polymers which can be produced in the presence of Phillips catalyst are limited to those having a molecular weight falling within a relatively high range.

As described in JP-B-45-40902 (The term "JP-B" as used herein means an "examined Japanese patent publication"), a catalyst comprising chromocene supported on a solid inorganic oxide such as silica undergoes a good effect of hydrogen as a molecular weight modifier and thus exhibits a good hydrogen response that allows the production of ethylene polymers having a relatively low molecular weight. However, this catalyst is disadvantageous in that it has a low activity and hence gives a poor productivity.

As described in JP-B-44-2996, JP-B-47-1766, JP-B-47-20004 and JP-B-47-21574, a catalyst obtained by reducing a chromic acid ester supported on a solid inorganic oxide such as silica with an organic aluminum compound, too, undergoes the effect of hydrogen as a molecular weight modifier. However, such a catalyst is disadvantageous in that it exhibits a deteriorated hydrogen response as compared with the foregoing catalyst comprising chromocene supported in a carrier and an insufficient activity.

An object of the present invention is to provide a process for the efficient production of an ethylene polymer having a wide molecular weight range at a remarkably improved productivity given by eliminating the above-described difficulties and attaining a high activity and a good hydrogen response.

DISCLOSURE OF THE INVENTION

The inventors made extensive studies of solution to the foregoing problems. As a result, the foregoing problems were solved by a process for the production of an ethylene polymer comprising the use of a catalyst which comprises a chromium compound, an organic aluminum compound and a carrier and which is prepared by a specific method.

The present invention relates to:

1) A polymerization catalyst obtained using a chromium compound, an organic aluminum compound and a carrier by a method comprising the following steps (a) to (d):

(a) contacting a chromium compound with a carrier in the presence or absence of a solvent;
   (b) adding an organic aluminum compound to said contacted substances at a temperature of not higher than 60° C. in an amount such that the mixing ratio of said organic aluminum compound to said chromium compound falls within the range of from 0.5/1 to 100/1 as calculated in terms of the ratio of aluminum atom/chromium atom (Al/Cr molar ratio) and that the following relationship (1) is satisfied:

$$\log_{10} t \leq 0.33 \log_{10} C + 0.35 \quad (1)$$

wherein t represents the time (min) required until the organic aluminum compound is added to give an Al/Cr molar ratio of 10/1; and C represents the amount of the carrier used (Kg);

(c) after the addition of the organic aluminum compound, stirring at a temperature of from 0° C. to 60° C. for 0.5 to 4 hours; and
   (d) removing the solvent used, unreacted matters and by-products at a temperature of not higher than 60° C. in such a manner that the following relationship (2) is satisfied:

$$\log_{10} T \leq 0.23 \log_{10} C + 1.10 \quad (2)$$

wherein T represents the time required until the removal is completed; and C represents the amount of the carrier used (Kg); and 2) A process for the production of an ethylene polymer using a polymerization catalyst which is obtained using a chromium compound, an organic aluminum compound and a carrier by a method comprising the above-described steps (a) to (d).

Preferred embodiments of the above 1) are as follows.

(a) The polymerization catalyst according to the above 1), wherein said chromium compound comprises chromium carboxylate, chromium-1,3-diketo compound and chromic acid ester.

(b) The polymerization catalyst according to the above 1), wherein said organic aluminum compound is an organic aluminum compound represented by the following general formula (5) or an alumoxane:

$$R^1_n Al (OR^2)_{3-n} \quad (5)$$

wherein $R^1$ and $R^2$ may be the same or different and each represent a $C_{1-18}$ hydrocarbon group; and n ranges from 0 to 3.

(c) The polymerization catalyst according to the above 1), wherein said carrier is a solid inorganic oxide.

(d) The polymerization catalyst according to the above 1), wherein said catalyst comprises a carrier having a specific surface area of from 50 to 1,000 m²/g, a pore volume of from 0.5 to 3.0 cm³/g and an average particle diameter of from 10 to 200 μm, and a chromium atom supported on the carrier in an amount of from 0.05 to 5.0 wt-% based on the weight of said carrier.

BEST MODE FOR CARRYING OUT THE INVENTION

Examples of the chromium compound (excluding chromium oxide) for use in the present invention include chromium carboxylate, chromium-1,3-diketo compound, and chromic acid ester.

Examples of the chromium carboxylate include compounds of chromium (II) or chromium (III), represented by the following general formulae (1) or (2):

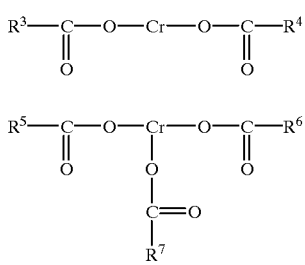

wherein $R^3$, $R^4$, $R^5$, $R^6$ and $R^7$ may be the same or different and each represents a hydrogen atom or $C_{1-18}$ hydrocarbon group, preferably a hydrogen atom or an alkyl or aryl group having 8 or less carbon atoms.

Specific examples of these chromium compounds include chromium formate (II), chromium acetate (II), chromium propionate (II), chromium butyrate (II), chromium pentanoate (II), chromium hexanoate (II), chromium 2-ethylhexanoate (II), chromium benzoate (II), chromium naphthenate (II), chromium oleate (II), chromium oxalate (II), chromium formate (III), chromium acetate (III), chromium propionate (III), chromium butyrate (III), chromium pentanoate (III), chromium hexanoate (III), chromium 2-ethylhexanoate (III), chromium benzoate (III), chromium naphthenate (III), chromium oleate (III), and chromium oxalate (III). Preferred among these chromium compounds are chromium acetate (II), chromium 2-ethylhexanoate (II), chromium acetate (III), and chromium 2-ethylhexanoate (III).

The chromium-1,3-diketo compound is a chromium complex (III) represented by the following general formula (3) having one to three 1,3-diketo compounds:

$$CrX_kY_tZ_u \quad (3)$$

wherein X is a 1,3-diketo type chelate ligand, preferably β-diketonate type chelate ligand; Y and Z may be the same or different and each represents a halogen atom (preferably fluorine, chlorine or bromine), alkoxy group (preferably $C_{1-6}$ alkoxy group, more preferably methoxy, ethoxy, isopropoxy or butoxy), aryloxy group (preferably aryloxy group having 10 or less carbon atoms, more preferably phenoxy or naphthoxy), alkyl group (preferably $C_{1-6}$ alkyl group, more preferably methyl, ethyl, propyl, butyl, pentyl or hexyl), aryl group (preferably aryl group having 10 or less carbon atoms, more preferably phenyl, tolyl or naphthyl) or amide group (preferably $C_{1-6}$ amide, more preferably dimethylamide, diethylamide, diisopropylamide or bis(trimethylsilyl) amide); k represents an integer of from 1 to 3; and t and u each represents an integer of from 0 to 2, with the proviso that the sum of k, t and u is 3.

Specific examples of the chromium-1,3-diketo compound include chromium-1,3-butanedionate, chromiumacetyl acetonate, chromium-2,4-hexanedionate, chromium-2,4-heptanedionate, chromium-2,4-octanedionate, chromium-3,5-octanedionate, chromiumbenzoyl acetonate, chromium-1,3-diphenyl-1,3-propanedionate, chromium-2-methyl-1,3-butanedionate, chromium-2-ethyl-1,3-butanedionate, chromium-2-phenyl-1,3-butanedionate, and chromium-1,2,3-triphenyl-1,3-propanedionate. Particularly preferred among these chromium-1,3-diketo compounds is chromiumacetyl acetonate.

The chromic acid ester is a chromium (VI) compound represented by the following general formula (4):

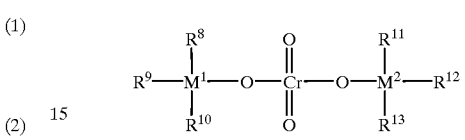

wherein $R^8$, $R^9$, $R^{10}$, $R^{11}$, $R^{12}$ and $R^{13}$ may be the same or different and each represents a $C_{1-18}$, preferably $C_{1-6}$ hydrocarbon group, preferably an alkyl or aryl group; and $M^1$ and $M^2$ each represents a carbon atom or silicon atom.

Specific examples of the chromic acid ester, if $M^1$ and $M^2$ each represents a carbon atom, include bis(tert-butyl) chromate, bis(1,1-dimethylpropyl) chromate, bis(2-phenyl-2-propyl) chromate, bis(1,1-diphenylethyl) chromate, bis (triphenylmethyl) chromate, bis(1,1,2,2-tetramethylpropyl) chromate, and bis(1,1,2-trimethylpropyl) chromate. Preferred among these chromic acid esters is bis(tert-butyl) chromate.

Specific examples of the chromic acid ester, if $M^1$ and $M^2$ each represents a silicon atom, include bis (trimethylsilyl) chromate, bis(triethylsilyl) chromate, bis (tributylsilyl) chromate, bis(triisopentylsilyl) chromate, bis(tri-2-ethylhexylsilyl) chromate, bis(tridecylsilyl) chromate, bis (tri(tetradecyl)silyl) chromate, bis (tribenzylsilyl) chromate, bis(triphenethylsilyl) chromate, bis(triphenylsilyl) chromate, bis(tritolylsilyl) chromate, bis(trixylylsilyl) chromate, bis(trinaphthylsilyl) chromate, bis (dimethylphenylsilyl) chromate, bis(diphenylmethylsilyl) chromate, bis(dimethyldexylsilyl) chromate, bis (dimethylisopropylsilyl) chromate, bis(tert-butyldimethylsilyl) chromate, bis(tri-tert-butylsilyl) chromate, bis(triethylphenylsilyl) chromate, and bis (trimethylnaphthylsilyl) chromate. Preferred among these chromic acid esters is bis(triphenylsilyl) chromate.

As the organic aluminum compound there is preferably used an organic aluminum compound represented by the following general formula (5):

$$R^1{}_nAl(OR^2)_{3-n} \quad (5)$$

wherein $R^1$ and $R^2$ may be the same or different and each represents a $C_{1-18}$, preferably $C_{1-6}$ hydrocarbon group, particularly an alkyl or aryl group; and n represents an 0, 1, 2 or 3.

Preferred examples of the organic aluminum compound represented by the foregoing general formula (5) include trimethyl aluminum, triethyl aluminum, tri-n-butyl aluminum, triisobutyl aluminum, tri-n-hexyl aluminum, trioctyl aluminum, dimethyl aluminum methoxide, dimethyl aluminum ethoxide, dimethyl aluminum isopropoxide, dimethyl aluminum n-butoxide, dimethyl aluminum isobutoxide, diethyl aluminum methoxide, diethyl aluminum ethoxide, diethyl aluminum isopropoxide, diethyl aluminum n-butoxide, diethyl aluminum isobutoxide, diisobutyl aluminum methoxide, diisobutyl aluminum ethoxide, diisobutyl aluminum isopropoxide, diisobutyl aluminum n-butoxide, diisobutyl aluminum isobutoxide, di-n-hexyl aluminum methoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum dimethoxide, ethyl aluminum diethoxide, ethyl aluminum diisopropoxide, ethyl aluminum di-n-butoxide, ethyl aluminum diisobtutoxide, isobutyl aluminum dimethoxide, isobutyl aluminum diethoxide, isobutyl aluminum diisopropoxide, isobutyl aluminum di-n-butoxide, isobutyl aluminum diisobutoxide, n-hexylaluminum dimethoxide, n-hexyl aluminum diethoxide, n-hexyl aluminum diisopropoxide, n-hexyl aluminum di-n-butoxide, n-hexyl aluminum diisobutoxide, aluminum trimethoxide, aluminum triethoxide, aluminum triisopropoxide, aluminum tri-n-butoxide, and aluminum triisobutoxide. Particularly preferred among these organic aluminum compounds are trialkyl aluminums such as trimethyl aluminum, triethyl aluminum and triisobutyl aluminum, and dialkyl aluminum alkoxides such as diethyl aluminum ethoxide and diisobutyl aluminum isobutoxide.

The alumoxane is a compound well known in the art, and its preparation process and structure are described in detail in Polyhedron, 9, pp. 429–453 (1990), Ziegler Catalysts, G. Fink et al. (Eds.) pp. 57–82, Springer-verlag (1995), etc. Examples of the alumoxane to be used in the present invention include compounds represented by the following general formulae (6) and (7):

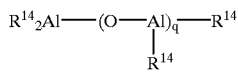

(6)

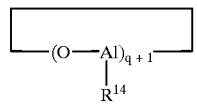

(7)

wherein $R^{14}$ represents a hydrocarbon group such as methyl, ethyl, propyl, n-butyl and isobutyl, preferably methyl or isobutyl; and q represents an integer of from 1 to 100, preferably not less than 4, particularly not less than 8.

The process for the preparation of this kind of compound is known. Examples of the process for the preparation of this kind of compound include a process which comprises adding a trialkyl aluminum to a suspension of a salt having water of crystallization (hydrated copper sulfate, hydrated aluminum sulfate, etc.) in an inert hydrocarbon solvent such as pentane, hexane, heptane, cyclohexane, decane, benzene and toluene, and a process which comprises allowing solid, liquid or gaseous water to act on a trialkyl aluminum in a hydrocarbon solvent.

Further, an alumoxane represented by the general formula (8) or (9) may be used.

(8)

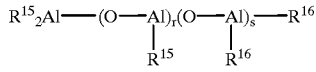

-continued (9)

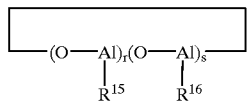

wherein $R^{15}$ represents a hydrocarbon group such as methyl, ethyl, propyl, n-butyl and isobutyl, preferably methyl or isobutyl; $R^{16}$ represents a group different from $R^{15}$ and is selected from hydrocarbon group such as methyl, ethyl, propyl, n-butyl and isobutyl, halogen such as chlorine and bromine, hydrogen atom and hydroxyl group, and a plurality of $R^{16}$ may be the same or different; and r represents an integer of normally from 1 to 100, preferably not less than 3, with the proviso that the sum of r and s is from 2 to 101, preferably not less than 6.

In the compound represented by the foregoing general formula (8) or (9), $(O—Al(R^{15}))_r$ unit and $(O—Al(R^{16}))_s$ unit may be those connected in a blocked manner or regularly or irregularly at random. The preparation of such an alumoxane can be accomplished in the same manner as the alumoxanes of the foregoing general formulae except that two or more trialkyl aluminums or one or more dialkyl aluminum monohalides or dialkyl aluminum monohydrides are used instead of the one trialkyl aluminum.

The organic aluminum compounds represented by the general formula (5) and the alumoxanes represented by the general formulae (6) to (9) may be used singly or in combination of two or more thereof. If two or more organic aluminum compounds are used, these organic aluminum compounds may be added in admixture or separately at the same time. Alternatively, these organic aluminum compounds may be successively added. In some detail, one of these organic aluminum compounds may be added, followed by the addition of the other organic aluminum compounds. The organic aluminum compound represented by the general formula (5) and the alumoxane may be used in combination. However, they are preferably used successively. In particular, it is preferred that the addition of the alumoxane be followed by the addition of the organic aluminum compound represented by the general formula (5).

The catalyst of the present invention is used supported on a carrier commonly used as a component of catalyst for polymerization of ethylene such as solid inorganic oxide. As the solid inorganic oxide to be used as carrier there may be used an oxide of metal belonging to the group 2, 4, 13 or 14. Specific examples of such a metal oxide include magnesia, titania, zirconia, alumina, aluminum phosphate, silica, silica-titania, silica-zirconia, silica-alumina, and mixture thereof. In the present invention, an inorganic oxide having a specific surface area of from 50 to m$^2$/g, preferably from 200 to 800 m$^2$/g, a pore volume of from 0.5 to 3.0 cm$^3$/g, preferably from 1.0 to 2.5 cm$^3$/g, and an average particle diameter of from 10 to 200 μm, preferably from 50 to 150 μm is preferably used.

These inorganic oxides are preferably calcined at a temperature of from 100° C. to 900° C. in a stream of nitrogen gas while being passed through a molecular sieves for 10 minutes to 24 hours before use. Thus, these inorganic oxides are preferably calcined in a sufficient amount of nitrogen gas while being fluidized in solid form.

As the method for obtaining a catalyst from the foregoing constituent components there is preferably used a method which comprises allowing a chromium compound and a carrier to come in contact with each other, and then allowing an organic aluminum compound to come in contact with the contact mixture. In this manner, the chromium compound and the organic aluminum compound are chemically adsorbed by the carrier.

The foregoing constituent components are preferably allowed to come in contact with each other in an inert hydrocarbon solvent having a boiling point of not higher than 200° C. such as propane, butane, isobutane, pentane, hexane, heptane, cyclohexane, decane, benzene, toluene and xylene. The amount of the solvent to be used per 1 Kg of the carrier used is from 1 to 100 Kg, preferably from 2 to 20 Kg, taking into account the time required for the removal of solvent. The amount of the chromium compound to come in contact with the carrier is preferably from 0.05 to 5.0 wt-%, more preferably from 0.05 to 2.0 wt-%, based on the weight of the carrier. The chromium compound is allowed to come in contact with the carrier in the form of solid or liquid as it is or in a form diluted with the foregoing inert hydrocarbon solvent. The time required until a predetermined amount of the chromium compound is added may be arbitrary within 2 hours, preferably 1 hour. The temperature at which the chromium compound is allowed to come in contact with the carrier is from 10° C. to 70° C., preferably from 10° C. to 60° C. The time during which the chromium compound is allowed to come in contact with the carrier is from 5 minutes to 24 hours, preferably from 30 minutes to 6 hours.

The organic aluminum compound may be allowed to come in contact with the chromium compound by adding the organic aluminum compound to the contact mixture of the chromium compound and the carrier. The time t (min) required until the organic aluminum compound is added in an amount such that the mixing ratio of organic aluminum compound to chromium compound is not more than 10/1 as calculated in terms of ratio of aluminum atom/chromium atom (Al/Cr molar ratio) in the course of addition thereof in an amount of from 0.5/1 to 100/1 is represented by the following relationship with the amount C of the carrier used (Kg):

$$\log_{10}t \leq 0.33\log_{10}C+0.35$$

preferably, $$\log_{10}t \leq 0.33\log_{10}C+0.25$$

more preferably, $$\log_{10}t \leq 0.33\log_{10}C+0.13.$$

If the organic aluminum compound is added slowly in a time exceeding the above defined range, the resulting activity and hydrogen response are lowered. The temperature at which the contact is effected is 60° C. at highest, preferably from 0° C. to 50° C. The contact at temperatures lower than this range requires cooling of the reactor and thus is not economic. On the contrary, if the contact is effected at temperatures higher than this range, the resulting activity and hydrogen response are lowered. The amount of the organic aluminum compound to be contacted is such that the molar ratio of aluminum atom to chromium atom is from 0.5 to 100, preferably from 1 to 30.

The contact mixture of the organic aluminum compound is then kept at a temperature of from 0° C. to 60° C., preferably from 10° C. to 50° C., with stirring for 0.5 to 4 hours, preferably 1 to 3 hours. If the contact mixture of the organic aluminum compound is kept at temperatures lower than this range, it requires cooling of the reactor and thus is not economic. If the contact mixture of the organic aluminum compound is kept at this temperature range for a period of time not longer than the above defined range, it cannot undergo sufficient contact. If the contact mixture of the organic aluminum compound is kept at temperatures higher than the above defined range for a period of time longer than the above defined range, the resulting activity and hydrogen response are lowered.

The contact mixture thus treated is preferably then subjected to removal of solvent used, unreacted matters, by-products, etc. by removal at atmospheric pressure or reduced pressure lower than 760 mmHg or filtration, followed by the recovery of catalyst by drying in a stream of inert gas, to give a free flowing dry powdery catalyst. The residual amount of solvent is not more than 5 wt-%, preferably not more than 2 wt-%, based on the catalyst thus obtained. If the catalyst thus obtained is kept in a slurried form, its activity is gradually lowered. The removal of solvent may be preceded by cleaning of the catalyst with an inert hydrocarbon solvent such as propane, butane, isobutane, pentane, hexane, cyclohexane, decane, benzene, toluene and xylene at a temperature of from 0° C. to 60° C., preferably from 10° C. to 50° C. The temperature at which the solvent is removed from the catalyst is from 0° C. to 60° C., preferably from 10° C. to 50° C. If the solvent is removed at temperatures lower than this range, it requires cooling of the reactor and thus is not economic. On the contrary, if the solvent is removed at temperatures higher than this range, the resulting activity and hydrogen response are lowered. Further, the time T (hr) required until the solvent used, unreacted matters, by-products, etc. are removed falls within the range represented by the following relationship with the amount C of the catalyst (Kg):

$$\log_{10}T \leq 0.23\log_{10}C+1.10$$

Preferably, the following condition is used. Under this condition, a solvent having a boiling point of not higher than 60° C. at 760 mmHg (e.g., pentane) may be used.

$$\log_{10}T \leq 0.23\log_{10}C+0.77$$

More preferably, the following condition is used. Under this condition, a solvent having a boiling point of not higher than 0° C. at 760 mmHg (e.g., isobutane) may be used.

$$\log_{10}T \leq 0.23\log_{10}C+0.32$$

If the removal of solvent is effected slowly in a time exceeding the above define range, the resulting activity and hydrogen response are lowered.

The production of the ethylene polymer of the present invention in the presence of the foregoing catalyst can be accomplished by a liquid phase polymerization process such as slurry polymerization and solution polymerization or a gas phase polymerization process.

As the gas phase polymerization process there may be employed a known polymerization process such as fluidized bed polymerization and agitated bed polymerization in the presence of an inert gas. If necessary, a so-called condensing mode involving the existence of a medium for the removal of polymerization heat may be employed.

The liquid phase polymerization process is normally effected in a hydrocarbon solvent. As the hydrocarbon solvent there may be used singly or in admixture inert hydrocarbons such as propane, butane, isobutane, hexane, cyclohexane, heptane, benzene, toluene and xylene.

The temperature at which the liquid phase or gas phase polymerization process is effected is normally from 0° C. to 300° C., practically from 20° C. to 200° C. If necessary, α-olefins such as propylene, 1-butene, 1-hexene, 4-methyl-1-pentene, 1-octene and α, ω-diene may be introduced into the reactor singly or in combination so that copolymerization takes place. The content of α-olefin in the resulting polymer is preferably not more than 10 mol-%, more preferably not more than 5 mol-%.

The catalyst of the present invention exhibits a good hydrogen response and thus can provide an ethylene polymer having a wide molecular weight range. The molecular weight of the ethylene polymer thus produced falls within the range of from 0.001 to 300, preferably from 0.01 to 200, as calculated in terms of MFR determined at a temperature of 190° C. under a load of 2.16 Kgf in accordance with Condition 4 in Table 1 of JIS K-7210 (1996). Hydrogen is allowed to exist in the reactor during polymerization in an amount such that the following relationship is satisfied:
For the liquid phase polymerization process, $0 \leq$ Hydrogen concentration in liquid phase (wt-%)/ Ethylene concentration in liquid phase (wt-%)$\leq 1.0 \times 10^{-1}$ Preferably, $0 \leq$ Hydrogen concentration in liquid phase (wt-%)/ Ethylene concentration in liquid phase (wt-%)$\leq 1.0 \times 10^{-2}$ For the gas phase polymerization process, $0 \leq$ Hydrogen partial pressure in gas phase (Kg/cm$^2$)/ Ethylene partial pressure in gas phase (Kg/cm$^2$)$\leq 1.0 \times 10$ Preferably, $0 \leq$ Hydrogen partial pressure in gas phase (Kg/cm$^2$)/ Ethylene partial pressure in gas phase (Kg/cm$^2$)$\leq 1.0$

EXAMPLE

The present invention will be further described in the following examples and comparative examples, but the present invention should not be construed as being limited thereto.

The measurement methods used in the following examples and comparative examples will be described hereinafter. * Melt flow rate: MFR (g/10 min) is defined by the measurement effected at a temperature of 190° C. under a load of 2.16 Kgf in accordance with Condition 4 in Table 1 of JIS K-7210 (1996).

Example 1
(1) Preparation of Catalyst

Into a 500 ml flask in which the air within had been replaced by nitrogen were charged 20.0 g of 952 grade silica (specific surface area: 300 m$^2$/g; pore volume: 1.6 cm$^3$/g; average particle diameter: 80 μm) produced by Davison Corp. which had been calcined at a temperature of 600° C. for 6 hours and 200 ml of n-hexane to make a slurry. To the slurry thus obtained was then added 7.7 ml of a 0.1 mol/l hexane solution of chromium 2-ethylhexanoate (III) produced by STREM CORP. (supported amount of chromium atom: 0.20 wt-%). The mixture was then stirred at a temperature of 20° C. for 1 hour. When the stirring was terminated, 7.7 ml of a 1.0 mol/l hexane solution of triethyl aluminum produced by Tosoh Akzo Corporation was added to the mixture in 5 seconds. The mixture was then stirred at a temperature of 20° C. for 1 hour. When the stirring was terminated, the solvent began to be removed under reduced pressure (5 mmHg) at a temperature of 20° C. In 20 minutes, a free flowing supported powdery catalyst was obtained.
(2) Polymerization Into a 3.0 l autoclave equipped with an agitator in which the air within had been thoroughly replaced by nitrogen were charged 1.5 l of isobutane and 100 mg of the catalyst prepared in the foregoing process (1). The autoclave was heated to a temperature of 90° C. where hydrogen was then introduced thereinto at a partial pressure of 8 kg /cm$^2$ (hydrogen concentration in isobutane: 4.6×10$^{-2}$ wt-%). Ethylene was then pressed into the autoclave in an amount of 14 Kg/cm$^2$ (ethylene concentration in isobutane: 8.3 wt-%; hydrogen concentration (wt-%)/ethylene concentration (wt-%): 5.5×10$^{-3}$) to initiate polymerization. In order to keep this ethylene partial pressure, ethylene was supplied into the autoclave as necessary. The autoclave was externally cooled so that the polymerization temperature was kept at 90° C. for 1 hour. At the end of this process, ethylene, hydrogen and isobutane were discharged from the system to terminate polymerization. As a result, 350 g of a white particulate polyethylene was obtained. The polyethylene thus obtained exhibited an activity of 3,500 g polymer/g catalyst/hr and MFR of 12.0 (g/10 min).

Example 2

A catalyst was prepared in the same manner as in Example 1 except that 7.7 ml of a 0.1 mol/l toluene solution of chromiumacetyl acetonate produced by Wako Pure Chemical Industries, Ltd. (supported amount of chromium atom: 0.20 wt-%) was added instead of chromium 2-ethylhexanoate (III) in the process (1) of Example 1. Using this catalyst, polymerization was effected. As a result, 380 g of a polyethylene was obtained. The polyethylene thus obtained exhibited an activity of 3,800 g polymer/g catalyst/ hr and MFR of 10.5 (g/10 min).

Example 3
(1) Synthesis of Bis(tert-butyl) Chromate

Chromium trioxide and tert-butanol were reacted with each other in accordance with the method described in Synth. Commun., 10, 905 (1980) to synthesize bis(tert-butyl) chromate.
(2) Preparation of Catalyst and Polymerization A catalyst was prepared in the same manner as in Example 1 except that 7.7 ml of a 0.1 mol/l hexane solution of bis(tert-butyl) chromate synthesized in the process (1) (supported amount of chromium atom: 0.20 wt-%) was added instead of chromium 2-ethylhexanoate (III) in the process (1) of Example 1. Using this catalyst, polymerization was effected. As a result, 420 g of a polyethylene was obtained. The polyethylene thus obtained exhibited an activity of 4,200 g polymer/g catalyst/hr and MFR of 14.5 (g/10 min).

Example 4

A catalyst was prepared in the same manner as in Example 1 except that 7.7 ml of a 0.1 mol/l hexane solution of bis(tert-butyl) chromate synthesized in the process (1) of Example 3 (supported amount of chromium atom: 0.20 wt-%) was added instead of chromium 2-ethylhexanoate (III) and 3.1 ml of a 1.0 mol/l hexane solution of triethyl aluminum was added in 5 seconds in the process (1) of Example 1. Using this catalyst, polymerization was effected. As a result, 400 g of a polyethylene was obtained. The polyethylene thus obtained exhibited an activity of 4,000 g polymer/g catalyst/hr and MFR of 14.1 (g/10 min)

Example 5

A catalyst was prepared in the same manner as in Example 1 except that 7.7 ml of a 0.1 mol/l hexane solution of bis(tert-butyl) chromate synthesized in the process (1) of Example 3 (supported amount of chromium atom: 0.20 wt-%) was added instead of chromium 2-ethylhexanoate (III) and 11.6 me of a 1.0 mol/l hexane solution of triethyl aluminum was added in 5 seconds in the process (1) of Example 1. Using this catalyst, polymerization was effected. As a result, 440 g of a polyethylene was obtained. The polyethylene thus obtained exhibited an activity of 4,400 g polymer/g catalyst/hr and MFR of 14.8 (g/10 min).

Example 6

A catalyst was prepared in the same manner as in Example 1 except that 7.7 ml of a 0.1 mol/l toluene solution of chromiumacetyl acetonate produced by Wako Pure Chemical Industries, Ltd. (supported amount of chromium atom: 0.20 wt-%) was added instead of chromium 2-ethylhexanoate (III) and 7.7 ml of a 1.0 mol/l hexane solution of diethyl aluminum ethoxide produced by Tosoh Akzo Corporation was added in 5 seconds in the process (1) of Example 1. Using this catalyst, polymerization was effected. As a result, 320 g of a polyethylene was obtained. The polyethylene thus obtained exhibited an activity of 3,200 g polymer/g catalyst/hr and MFR of 16.3 (g/10 min).

Example 7

A catalyst was prepared in the same manner as in Example 1 except that 7.7 ml of a 0.1 mol/l hexane solution of bis(tert-butyl) chromate synthesized in the process (1) of Example 3 (supported amount of chromium atom: 0.20 wt-%) was added instead of chromium 2-ethylhexanoate (III) and 7.7 ml of a 1.0 mol/l hexane solution of diethyl aluminum ethoxide produced by Tosoh Akzo Corporation was added in 5 seconds. Using this catalyst, polymerization was effected. As a result, 400 g of a polyethylene was obtained. The polyethylene thus obtained exhibited an activity of 4,000 g polymer/g catalyst/hr and MFR of 20.6 (g/10 min).

Example 8

A catalyst was prepared in the same manner as in Example 1 except that 7.7 ml of a 1.0 mol/l hexane solution of methyl alumoxane produced by Tosoh Akzo Corporation was added in 5 seconds instead of triethyl aluminum. Using this catalyst, polymerization was effected. As a result, 270 g of a polyethylene was obtained. The polyethylene thus obtained exhibited an activity of 2,700 g polymer/g catalyst/hr and MFR of 7.7 (g/10 min).

Example 9

(1) Synthesis of bis(triphenylsilyl) chromate

Chromium trioxide and triphenyl silanol were reacted with each other in accordance with U.S. Pat. No. 2,863,891 to synthesize bis(triphenylsilyl) chromate.

(2) Preparation of Catalyst and Polymerization

A catalyst was prepared in the same manner as in Example 1 except that 488 mg of bis(triphenylsilyl) chromate synthesized in the process (1) of Example 1 (supported amount of chromium atom: 0.20 wt-%) was added instead of chromium 2-ethylhexanoate (III) and 7.7 ml of a 1.0 mol/l toluene solution of methyl alumoxane produced by Tosoh Akzo Corporation was added in 5 seconds instead of triethyl aluminum. The material was dried at a temperature of 20° C. for 1 hour in the same manner as in the process (1) of Example 1. To the material was then added 7.7 ml of a 1.0 mol/l hexane solution of diethyl aluminum ethoxide produced by Tosoh Akzo Corporation in 5 seconds. The mixture was then stirred at a temperature of 20° C. for 1 hour. The mixture was then dried in the same manner as in Example 1. Using this catalyst, polymerization was effected. As a result, 640 g of a polyethylene was obtained. The polyethylene thus obtained exhibited an activity of 6,400 g polymer/g catalyst/hr and MFR of 22.2 (g/10 min).

Example 10

The polymerization procedure of Example 3 was followed except that the partial pressure at which hydrogen is introduced into the autoclave was 10 Kg/cm$^2$ (hydrogen concentration in isobutane: $5.8 \times 10^{-2}$ wt-%; hydrogen concentration (wt-%)/ethylene concentration (wt-%): $7.0 \times 10^{-3}$). As a result, 380 g of a polyethylene was obtained. The polyethylene thus obtained exhibited an activity of 3,800 g polymer/g catalyst/hr and MFR of 38.4 (g/10 min).

Example 11

The polymerization procedure of Example 3 was followed except that hydrogen was not added during polymerization (hydrogen concentration (wt-%)/ethylene concentration (wt-%): 0). As a result, 440 g of a polyethylene was obtained. The polyethylene thus obtained exhibited an activity of 4,400 g polymer/g catalyst/hr and MFR of 0.07 (g/10 min).

Example 12

The polymerization procedure of Example 3 was followed except that 10 ml of 1-hexene was pressed into the autoclave. As a result, 440 g of a polyethylene was obtained. The polyethylene thus obtained exhibited an activity of 4,400 g polymer/g catalyst/hr and MFR of 18.2 (g/10 min). The polymer thus obtained was then subjected to $^{13}$C-NMR analysis. As a result, the polymer was confirmed to contain a butyl branch derived from 1-hexene in an amount of 3 wt-%.

Example 13

(1) Preparation of Catalyst

Into a 500 ml flask in which the air within had been replaced by nitrogen were charged 50 Kg of 952 grade silica (specific surface area: 300 m$^2$/g; pore volume: 1.6 cm$^3$/g; average particle diameter: 80 μm) produced by Davison Corp. which had been calcined at a temperature of 600° C. for 6 hours and 250 ml of isobutane to make a slurry. To the slurry thus obtained was then added 1.92 ml of a 1.0 mol/l hexane solution of bis(tert-butyl) chromate synthesized in the process (1) of Example 3 (supported amount of chromium atom: 0.20 wt-%). The mixture was then stirred at a temperature of 30° C. for 1 hour. When the stirring was terminated, 19.2 ml of a 1.0 mol/l hexane solution of triethyl aluminum produced by Tosoh Akzo Corporation was added to the mixture in 1 minute. The mixture was then stirred at a temperature of 30° C. for 1 hour. When the stirring was terminated, the solvent began to be removed under reduced pressure (20 mmHg) at a temperature of 40° C. In 2 hours, a free flowing supported powdery catalyst was obtained.

(2) Polymerization

The polymerization procedure of Example 1 was followed except that the catalyst obtained in the process (1) was used. As a result, 450 g of a polyethylene was obtained. The polyethylene thus obtained exhibited an activity of 4,500 g polymer/g catalyst/hr and MFR of 14.5 (g/10 min).

Example 14

(1) Preparation of Catalyst

Into a 4 m$^3$ autoclave in which the air within had been replaced by nitrogen were charged 200 Kg of 952 grade silica (specific surface area: 300 m$^2$/g; pore volume: 1.6 cm³/g; average particle diameter: 80 μm) produced by Davison Corp. which had been calcined at a temperature of 600° C. for 6 hours and 1,500 l of isobutane to make a slurry. To the slurry thus obtained was then added 7.68 l of a 1.0 mol/l hexane solution of bis(tert-butyl) chromate synthesized in the process (1) of Example 3 (supported amount of chromium atom: 0.20 wt-%). The mixture was then stirred at a temperature of 30° C. for 1 hour. When the stirring was terminated, 76.8 l of a 1.0 mol/l hexane solution of triethyl aluminum produced by Tosoh Akzo Corporation was added to the mixture in 5 minutes. The mixture was then stirred at a temperature of 30° C. for 1 hour. When the stirring was terminated, the solvent began to be removed under reduced pressure (20 mmHg) at a temperature of 40° C. In 5 hours, a free flowing supported powdery catalyst was obtained.

(2) Polymerization

The polymerization procedure of Example 1 was followed except that the catalyst obtained in the process (1) was used. As a result, 460 g of a polyethylene was obtained. The polyethylene thus obtained exhibited an activity of 4,600 g polymer/g catalyst/hr and MFR of 14.6 (g/10 min).

Example 15

(1) Preparation of Catalyst

Into a 500 l autoclave in which the air within had been replaced by nitrogen were charged 50 Kg of 952 grade silica (specific surface area: 300 m²/g; pore volume: 1.6 cm³/g; average particle diameter: 80 μm) produced by Davison Corp. which had been calcined at a temperature of 600° C. for 6 hours and 250 l of isobutane to make a slurry. To the slurry thus obtained was then added 1.22 Kg of bis(triphenylsilyl) chromate synthesized in the process (1) of Example 9 (supported amount of chromium atom: 0.20 wt-%). The mixture was then stirred at a temperature of 30° C. for 1 hour. When the stirring was terminated, 19.2 l of a 1.0 mol/l toluene solution of methyl alumoxane produced by Tosoh Akzo Corporation was added to the mixture in 1 minute. The mixture was then stirred at a temperature of 30° C. for 1 hour. When the stirring was terminated, 19.2 l of a 1.0 mol/l hexane solution of diethyl aluminum ethoxide produced by Tosoh Akzo Corporation was added to the mixture in 1 minute. The mixture was then stirred at a temperature of 30° C. for 1 hour. When the stirring was terminated, the solvent began to be removed under reduced pressure (20 mmHg) at a temperature of 40° C. In 2 hours, a free flowing supported powdery catalyst was obtained.

(2) Polymerization

The polymerization procedure of Example 1 was followed except that the catalyst obtained in the process (1) was used. As a result, 650 g of a polyethylene was obtained. The polyethylene thus obtained exhibited an activity of 6,500 g polymer/g catalyst/hr and MFR of 23.0 (g/10 min).

Example 16

(1) Preparation of Catalyst

Into a 4 m³ autoclave in which the air within had been replaced by nitrogen were charged 200 Kg of 952 grade silica (specific surface area: 300 m²/g; pore volume: 1.6 cm³/g; average particle diameter: 80 μm) produced by Davison Corp. which had been calcined at a temperature of 600° C. for 6 hours and 1,500 l of isobutane to make a slurry. To the slurry thus obtained was then added 4.88 Kg of bis(triphenylsilyl) chromate synthesized in the process (1) of Example 9 (supported amount of chromium atom: 0.20 wt-%). The mixture was then stirred at a temperature of 30° C. for 1 hour. When the stirring was terminated, 76.8 l of a 1.0 mol/l toluene solution of methyl alumoxane produced by Tosoh Akzo Corporation was added to the mixture in 5 minutes. The mixture was then stirred at a temperature of 30° C. for 1 hour. When the stirring was terminated, 76.8 l of a 1.0 mol/l hexane solution of diethyl aluminum ethoxide produced by Tosoh Akzo Corporation was added to the mixture in 5 minutes. The mixture was then stirred at a temperature of 30° C. for 1 hour. When the stirring was terminated, the solvent began to be removed under reduced pressure (20 mmHg) at a temperature of 40° C. In 5 hours, a free flowing supported powdery catalyst was obtained.

(2) Polymerization

The polymerization procedure of Example 1 was followed except that the catalyst obtained in the process (1) was used. As a result, 660 g of a polyethylene was obtained. The polyethylene thus obtained exhibited an activity of 6,600 g polymer/g catalyst/hr and MFR of 22.6 (g/10 min).

Example 17

A catalyst was prepared in the same manner as in Example 15 except that the removal of solvent after retention was effected at a temperature of 40° C. for 7 hours instead of 40° C. for 2 hours. Using this catalyst, polymerization was effected. As a result, 620 g of a polyethylene was obtained. The polyethylene thus obtained exhibited an activity of 6,200 g polymer/g catalyst/hr and MFR of 21.2 (g/10 min).

Example 18

A catalyst was prepared in the same manner as in Example 15 except that the removal of solvent after retention was effected at a temperature of 40° C. in a stream of dried nitrogen gas for 20 hours instead of 40° C. for 2 hours. Using this catalyst, polymerization was effected. As a result, 600 g of a polyethylene was obtained. The polyethylene thus obtained exhibited an activity of 6,000 g polymer/g catalyst/hr and MFR of 20.1 (g/10 min).

Example 19

(Gas phase polymerization)

A vertical oscillation type reactor (volume: 150 cm³; diameter: 50 mm; oscillation speed: 420 times/min. (7 Hz); oscillation distance: 6 cm) resembling a fluidized bed reactor similar to that described in Eur. Polym. J., Vol. 21, 245 (1985) was made. Using this vertical oscillation type reactor, gas phase polymerization was effected.

Into the foregoing reactor in which the air within had been replaced by nitrogen was charged an ampule which had had 30 mg of the catalyst obtained in the process (1) of Example 15 enclosed therein in an atmosphere of nitrogen. The reactor was heated to a temperature of 86° C. where hydrogen was then introduced thereinto at a partial pressure of 8 Kg/cm² Ethylene was then pressed into the reactor at 14 Kg/cm² (hydrogen partial pressure/ethylene partial pressure: $5.7 \times 10^{-1}$). Oscillation was then initiated to destroy the ampule so that polymerization was initiated.

In order to maintain the predetermined ethylene pressure in the reactor, ethylene was supplied into the reactor through a flexible joint as necessary.

Polymerization reaction was effected at a temperature of 90° C. for 20 minutes. Thereafter, the supply of ethylene was discontinued. The reactor was then cooled to room temperature. The reactor was then degassed. The contents of the reactor were then withdrawn. As a result, 30 g of a polyethylene was obtained. The polyethylene thus obtained exhibited an activity of 3,000 g polymer/g catalyst/hr and MFR of 32.5 (g/10 min).

Comparative Example 1

A catalyst was prepared in the same manner as in Example 3 except that triethyl aluminum was added dropwise in 5 minutes instead of 5 seconds. Using this catalyst, polymerization was effected. As a result, 90 g of a polyethylene was obtained. The polyethylene thus obtained exhibited an activity of 900 g polymer/g catalyst/hr and MFR of 0.3 (g/10 min). Thus, the polyethylene thus obtained exhibited a remarkably deteriorated activity, a low MFR and a deteriorated hydrogen response as compared with that of Example 3.

Comparative Example 2

A catalyst was prepared in the same manner as in Example 3 except that the retention of the mixture after addition of triethyl aluminum was effected under the reflux of hexane (bath temperature: 8° C.) for 5 hours instead of 20° C. for 1 hour. Using this catalyst, polymerization was effected. As a result, 120 g of a polyethylene was obtained. The polyethylene thus obtained exhibited an activity of 1,200 g polymer/g catalyst/hr and MFR of 0.4 (g/10 min). Thus, the polyethylene thus obtained exhibited a remarkably deteriorated activity, a low MFR and a deteriorated hydrogen response as compared with that of Example 3.

Comparative Example 3

A catalyst was prepared in the same manner as in Example 3 except that the removal of solvent after retention was effected at 20° C. in a stream of dried nitrogen gas for 30 hours instead of 20° C. for 20 hours. Using this catalyst, polymerization was effected. As a result, 67 g of a polyethylene was obtained. The polyethylene thus obtained exhibited an activity of 670 g polymer/g catalyst/hr and MFR of 0.1 (g/10 min). Thus, the polyethylene thus obtained exhibited a remarkably deteriorated activity, a low MFR and a deteriorated hydrogen response as compared with that of Example 3.

Comparative Example 4

A catalyst was prepared in the same manner as in Example 13 except that triethyl aluminum was added dropwise in 20 minutes instead of 1 minute. Using this catalyst, polymerization was effected. As a result, 85 g of a polyethylene was obtained. The polyethylene thus obtained exhibited an activity of 850 g polymer/g catalyst/hr and MFR of 0.3 (g/10 min). Thus, the polyethylene thus obtained exhibited a remarkably deteriorated activity, a low MFR and a deteriorated hydrogen response as compared with that of Example 13.

Comparative Example 5

A catalyst was prepared in the same manner as in Example 13 except that the retention of the mixture after addition of triethyl aluminum was effected at 80° C. for 6 hours instead of 30° C. for 1 hour. Using this catalyst, polymerization was effected. As a result, 130 g of a polyethylene was obtained. The polyethylene thus obtained exhibited an activity of 1,300 g polymer/g catalyst/hr and MFR of 0.5 (g/10 min). Thus, the polyethylene thus obtained exhibited a remarkably deteriorated activity, a low MFR and a deteriorated hydrogen response as compared with that of Example 13.

Comparative Example 6

A catalyst was prepared in the same manner as in Example 13 except that the removal of solvent after retention was effected at 40° C. in a stream of dried nitrogen gas for 60 hours instead of 40° C. for 2 hours. Using this catalyst, polymerization was effected. As a result, 50 g of a polyethylene was obtained. The polyethylene thus obtained exhibited an activity of 500 g polymer/g catalyst/hr and MFR of 0.1 (g/10 min). Thus, the polyethylene thus obtained exhibited a remarkably deteriorated activity, a low MFR and a deteriorated hydrogen response as compared with that of Example 13.

Comparative Example 7

A catalyst was prepared in the same manner as in Example 14 except that triethyl aluminum was added dropwise in 1 hour instead of 5 minutes. Using this catalyst, polymerization was effected. As a result, 75 g of a polyethylene was obtained. The polyethylene thus obtained exhibited an activity of 750 g polymer/g catalyst/hr and MFR of 0.2 (g/10 min). Thus, the polyethylene thus obtained exhibited a remarkably deteriorated activity, a low MFR and a deteriorated hydrogen response as compared with that of Example 14.

Comparative Example 8

A catalyst was prepared in the same manner as in Example 14 except that the retention of the mixture after addition of triethyl aluminum was effected at 80° C. for 8 hours instead of 30° C. for 1 hour. Using this catalyst, polymerization was effected. As a result, 120 g of a polyethylene was obtained. The polyethylene thus obtained exhibited an activity of 1,200 g polymer/g catalyst/hr and MFR of 0.4 (g/10 min). Thus, the polyethylene thus obtained exhibited a remarkably deteriorated activity, a low MFR and a deteriorated hydrogen response as compared with that of Example 14.

Comparative Example 9

A catalyst was prepared in the same manner as in Example 14 except that the removal of solvent after retention was effected at 40° C. in a stream of dried nitrogen gas for 90 hours instead of 40° C. for 5 hours. Using this catalyst, polymerization was effected. As a result, 42 g of a polyethylene was obtained. The polyethylene thus obtained exhibited an activity of 420 g polymer/g catalyst/hr and MFR of 0.1 (g/10 min). Thus, the polyethylene thus obtained exhibited a remarkably deteriorated activity, a low MFR and a deteriorated hydrogen response as compared with that of Example 14.

Comparative Example 10

A catalyst was prepared in the same manner as in Example 15 except that methyl alumoxane and diethyl aluminum ethoxide were added dropwise in 20 minutes instead of 1 minute. Using this catalyst, polymerization was effected. As a result, 92 g of a polyethylene was obtained. The polyethylene thus obtained exhibited an activity of 920 g polymer/g catalyst/hr and MFR of 0.5 (g/10 min). Thus, the polyethylene thus obtained exhibited a remarkably deteriorated activity, a low MFR and a deteriorated hydrogen response as compared with that of Example 15.

Comparative Example 11

A catalyst was prepared in the same manner as in Example 15 except that the retention of the mixture after addition of diethyl aluminum ethoxide was effected at 80° C. for 6 hours instead of 30° C. for 1 hour. Using this catalyst, polymerization was effected. As a result, 150 g of a polyethylene was obtained. The polyethylene thus obtained exhibited an activity of 1,500 g polymer/g catalyst/hr and MFR of 0.6 (g/10 min). Thus, the polyethylene thus obtained exhibited a remarkably deteriorated activity, a low MFR and a deteriorated hydrogen response as compared with that of Example 15.

Comparative Example 12

A catalyst was prepared in the same manner as in Example 15 except that the removal of solvent after retention was effected at 40° C. in a stream of dried nitrogen gas for 60 hours instead of 40° C. for 2 hours. Using this catalyst, polymerization was effected. As a result, 62 g of a polyethylene was obtained. The polyethylene thus obtained exhibited an activity of 620 g polymer/g catalyst/hr and MFR of 0.2 (g/10 min). Thus, the polyethylene thus obtained exhibited a remarkably deteriorated activity, a low MFR and a deteriorated hydrogen response as compared with that of Example 15.

Comparative Example 13

A catalyst was prepared in the same manner as in Example 16 except that methyl alumoxane and diethyl aluminum ethoxide were added dropwise in 1 hour instead of 5 minutes. Using this catalyst, polymerization was effected. As a result, 87 g of a polyethylene was obtained. The polyethylene thus obtained exhibited an activity of 870 g polymer/g catalyst/hr and MFR of 0.5 (g/10 min). Thus, the polyethylene thus obtained exhibited a remarkably deteriorated activity, a low MFR and a deteriorated hydrogen response as compared with that of Example 16.

Comparative Example 14

A catalyst was prepared in the same manner as in Example 16 except that the retention of the mixture after addition of diethyl aluminum ethoxide was-effected at 80° C. for 8 hours instead of 30° C. for 1 hour. Using this catalyst, polymerization was effected. As a result, 140 g of a polyethylene was obtained. The polyethylene thus obtained exhibited an activity of 1,400 g polymer/g catalyst/hr and MFR of 0.6 (g/10 min). Thus, the polyethylene thus obtained exhibited a remarkably deteriorated activity, a low MFR and a deteriorated hydrogen response as compared with that of Example 16.

Comparative Example 15

A catalyst was prepared in the same manner as in Example 16 except that the removal of solvent after retention was effected at 40° C. in a stream of dried nitrogen gas for 90 hours instead of 40° C. for 5 hours. Using this catalyst, polymerization was effected. As a result, 63 g of a polyethylene was obtained. The polyethylene thus obtained exhibited an activity of 630 g polymer/g catalyst/hr and MFR of 0.3 (g/10 min). Thus, the polyethylene thus obtained exhibited a remarkably deteriorated activity, a low MFR and a deteriorated hydrogen response as compared with that of Example 15.

The process conditions under which the catalysts of Examples 1 to 19 and Comparative Examples 1 to 15 had been produced, the activity of the catalysts thus obtained, and MFR of the ethylene polymers produced in the presence of these catalysts are set forth in Table 1.

TABLE 1

| Example No. | Al/Cr molar ratio | Contact temp. of organic Al | $\log_{10} t$ | $0.33 \log_{10} C + 0.35$ | Retention temp. (° C.) | Retention time (hr) |
|---|---|---|---|---|---|---|
| 1 | 10 | 20 | −1.00 | −0.21 | 20 | 1 |
| 2 | 10 | 20 | −1.00 | −0.21 | 20 | 1 |
| 3 | 10 | 20 | −1.00 | −0.21 | 20 | 1 |
| 4 | 4 | 20 | −1.00 | −0.21 | 20 | 1 |
| 5 | 15 | 20 | −1.00 | −0.21 | 20 | 1 |
| 6 | 10 | 20 | −1.00 | −0.21 | 20 | 1 |
| 7 | 10 | 20 | −1.00 | −0.21 | 20 | 1 |
| 8 | 10 | 20 | −1.00 | −0.21 | 20 | 1 |
| 9 | 20 | 20 | −1.00 | −0.21 | 20 | 1 |
| 10 | 10 | 20 | −1.00 | −0.21 | 20 | 1 |
| 11 | 10 | 20 | −1.00 | −0.21 | 20 | 1 |
| 12 | 10 | 20 | −1.00 | −0.21 | 20 | 1 |
| 13 | 10 | 30 | 0 | 0.91 | 30 | 1 |
| 14 | 10 | 30 | 0.70 | 1.11 | 30 | 1 |
| 15 | 20 | 30 | 0 | 0.91 | 30 | 1 |
| 16 | 20 | 30 | 0.70 | 1.11 | 30 | 1 |
| 17 | 20 | 30 | 0 | 0.91 | 30 | 1 |
| 18 | 20 | 30 | 0 | 0.91 | 30 | 1 |
| 19 | 20 | 30 | 0 | 0.91 | 30 | 1 |
| Comparative Example | | | | | | |
| 1 | 10 | 20 | 0.70 | −0.21 | 20 | 1 |
| 2 | 10 | 20 | −1.08 | −0.21 | 80 | 6 |
| 3 | 10 | 20 | −1.08 | −0.21 | 20 | 1 |
| 4 | 10 | 30 | 1.30 | 0.91 | 30 | 1 |
| 5 | 10 | 30 | 0 | 0.91 | 80 | 6 |
| 6 | 10 | 30 | 0 | 0.91 | 30 | 1 |
| 7 | 10 | 30 | 1.78 | 1.11 | 30 | 1 |
| 8 | 10 | 30 | 0.70 | 1.11 | 80 | 8 |
| 9 | 10 | 30 | 0.70 | 1.11 | 30 | 1 |
| 10 | 20 | 30 | 1.30 | 0.91 | 30 | 1 |
| 11 | 20 | 30 | 0 | 0.91 | 80 | 6 |
| 12 | 20 | 30 | 0 | 0.91 | 30 | 1 |
| 13 | 20 | 30 | 1.78 | 1.11 | 30 | 1 |
| 14 | 20 | 30 | 0.70 | 1.11 | 80 | 8 |

TABLE 1-continued

| 15 | 20 | 30 | 0.70 | 1.11 | 30 | 1 |
|---|---|---|---|---|---|---|

| | Removal temp. (° C.) | $\log_{10}T$ | $0.23\log_{10}C + 1.10$ | Activity (g-polymer/g g-catalyst/hr) | MFR (g/10 min) |
|---|---|---|---|---|---|
| Example No. | | | | | |
| 1 | 20 | −0.48 | 0.71 | 3,500 | 12.0 |
| 2 | 20 | −0.48 | 0.71 | 3,800 | 10.5 |
| 3 | 20 | −0.48 | 0.71 | 4,200 | 14.5 |
| 4 | 20 | −0.48 | 0.71 | 4,000 | 14.1 |
| 5 | 20 | −0.48 | 0.71 | 4,400 | 14.8 |
| 6 | 20 | −0.48 | 0.71 | 3,200 | 16.3 |
| 7 | 20 | −0.48 | 0.71 | 4,000 | 20.6 |
| 8 | 20 | −0.48 | 0.71 | 2,700 | 7.7 |
| 9 | 20 | −0.48 | 0.71 | 6,400 | 22.2 |
| 10 | 20 | −0.48 | 0.71 | 3,800 | 38.4 |
| 11 | 20 | −0.48 | 0.71 | 4,400 | 0.07 |
| 12 | 20 | −0.48 | 0.71 | 4,400 | 18.2 |
| 13 | 40 | 0.30 | 1.49 | 4,500 | 14.5 |
| 14 | 40 | 0.70 | 1.63 | 4,600 | 14.6 |
| 15 | 40 | 0.30 | 1.49 | 6,500 | 23.0 |
| 16 | 40 | 0.70 | 1.63 | 6,600 | 22.6 |
| 17 | 40 | 0.85 | 1.49 | 6,200 | 21.2 |
| 18 | 40 | 1.30 | 1.49 | 6,000 | 20.1 |
| 19 | 40 | 0.30 | 1.49 | 3,000 | 32.5 |
| Comparative Example | | | | | |
| 1 | 20 | −0.48 | 0.71 | 900 | 0.3 |
| 2 | 20 | −0.48 | 0.71 | 1,200 | 0.4 |
| 3 | 20 | 1.48 | 0.71 | 670 | 0.1 |
| 4 | 40 | 0.30 | 1.49 | 850 | 0.3 |
| 5 | 40 | 0.30 | 1.49 | 1,300 | 0.5 |
| 6 | 40 | 1.78 | 1.49 | 500 | 0.1 |
| 7 | 40 | 0.70 | 1.63 | 750 | 0.2 |
| 8 | 40 | 0.70 | 1.63 | 1,200 | 0.4 |
| 9 | 40 | 1.95 | 1.63 | 420 | 0.1 |
| 10 | 40 | 0.30 | 1.49 | 920 | 0.5 |
| 11 | 40 | 0.30 | 1.49 | 1,500 | 0.6 |
| 12 | 40 | 1.78 | 1.49 | 620 | 0.2 |
| 13 | 40 | 0.70 | 1.63 | 870 | 0.5 |
| 14 | 40 | 0.70 | 1.63 | 1,400 | 0.6 |
| 15 | 40 | 1.95 | 1.63 | 630 | 0.3 |

INDUSTRIAL APPLICABILITY

The implication of the present invention makes it possible to efficiently produce an ethylene polymer having a wide molecular weight range at a remarkably improved productivity given by the use of a novel catalyst having a high activity and a good hydrogen response. Thus, the present invention has an industrial value.

What is claimed is:

1. A polymerization catalyst obtained using a chromium compound, an organic aluminum compound and a carrier by a method comprising the following steps (a) to (d) in order to enhance activity and hydrogen response:

(a) contacting a chromium compound with a carrier in the presence or absence of a solvent, wherein the amount of carrier used is 50 kg or more;

(b) adding an organic aluminum compound to said contacted substances at a temperature of not higher than 60° C. in an amount such that the mixing ratio of said organic aluminum compound to said chromium compound falls within the range of from 0.5/1 to 100/1 as calculated in terms of the ratio of aluminum atom/chromium atom (Al/Cr atomic ratio) and that the following relationship (1) is satisfied:

$$\log_{10}t \leq 0.33\log_{10}C + 0.35 \quad (1)$$

wherein t represents the time (min) required until the organic aluminum compound is added to give an Al/Cr atomic ratio of not more than 10/1; and C represents the amount of the carrier used (Kg);

(c) after the addition of the organic aluminum compound, stirring at a temperature of from 0° C. to 60° C. for 0.5 to 4 hours; and (d) removing the solvent used, unreacted matters and by-products at a temperature of not higher than 60° C. in such a manner that the following relationship (2) is satisfied so as to regulate the residual amount of solvent to not more than 5 wt % based on the amount of catalyst:

$$\log_{10}T \leq 0.23\log_{10}C + 0.77 \quad (2)$$

wherein T represents the time (hr) required until the removal is completed; and C represents the amount of the carrier used (Kg).

2. The polymerization catalyst according to claim 1, wherein said chromium compound is chromium carboxylate, chromium-1,3-diketo compound or chromic acid ester.

3. The polymerization catalyst according to claim 1, wherein said organic aluminum compound is an organic aluminum compound represented by the following general formula (5) or an alumoxane:

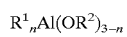

(5)

wherein $R^1$ and $R^2$ may be the same or different and each represents a $C_{1-18}$ hydrocarbon group; and n ranges from 0 to 3.

4. The polymerization catalyst according to claim 1, wherein said carrier is a solid inorganic oxide.

5. The polymerization catalyst according to claim 1, wherein said catalyst comprises a carrier having a specific surface area of from 50 to 1,000 m²/g, a pore volume of from 0.5 to 3.0 cm³/g and an average particle diameter of from 10 to 200 μm, and a chromium atom supported on the carrier in an amount of from 0.05 to 5.0 wt-% based on the weight of said carrier.

6. A process for the production of an ethylene polymer using a polymerization catalyst which is obtained by using a chromium compound, an organic aluminum compound and a carrier by a method comprising the following steps (a) to (d) in order to enhance activity and hydrogen response:

(a) contacting a chromium compound with a carrier in the presence or absence of a solvent, wherein the amount of carrier used is 50 kg or more;

(b) adding an organic aluminum compound to said contacted substances at a temperature of not higher than 60° C. in an amount such that the mixing ratio of said organic aluminum compound to said chromium compound falls within the range of from 0.5/1 to 100/1 as calculated in terms of the ratio of aluminum atom/chromium atom (Al/Cr atomic ratio) and that the following relationship (1) is satisfied:

$$\log_{10} t \leq 0.33 \log_{10} C + 0.35 \quad (1)$$

wherein t represents the time (min) required until the organic aluminum compound is added to give an Al/Cr atomic ratio of not more than 10/1; and C represents the amount of the carrier used (Kg);

(c) after the addition of the organic aluminum compound, stirring at a temperature of from 0° C. to 60° C. for 0.5 to 4 hours; and (d) removing the solvent used, unreacted matters and by-products at a temperature of not higher than 60° C. in such a manner that the following relationship (2) is satisfied so as to regulate the residual amount of solvent to not more than 5 wt % based on the amount of catalyst:

$$\log_{10} T \leq 0.23 \log_{10} C + 0.77 \quad (2)$$

wherein T represents the time (hr) required until the removal is completed; and C represents the amount of the carrier used (Kg).

* * * * *